United States Patent [19]

Coassin et al.

[11] Patent Number: 5,387,395

[45] Date of Patent: Feb. 7, 1995

[54] FLUID DISTRIBUTION MANIFOLD

[75] Inventors: Peter J. Coassin, San Juan Capistrano; William H. Shope, Santa Ana; Clement P. Aime, Huntington Beach, all of Calif.

[73] Assignee: Beckman Instruments, Inc., Fullerton, Calif.

[21] Appl. No.: 909,553

[22] Filed: Jul. 6, 1992

[51] Int. Cl.[6] .................. F16K 15/14; F16K 21/04
[52] U.S. Cl. .................... 422/81; 422/63; 422/103; 422/116; 137/512; 137/846; 137/883
[58] Field of Search .................. 422/63, 144, 102, 70, 422/103, 93, 100, 84, 81, 89, 116; 137/118, 266, 512, 846, 271, 883; 536/27-29

[56] References Cited

U.S. PATENT DOCUMENTS

| | | | |
|---|---|---|---|
| 2,834,368 | 8/1955 | Gray | 137/271 |
| 3,548,849 | 12/1970 | Purcell et al. | 137/81.5 |
| 3,679,333 | 7/1972 | Zoppi | 137/512 |
| 3,765,441 | 10/1973 | Chang | 137/271 |
| 3,928,711 | 12/1975 | Jakobsen | 137/883 |
| 3,938,960 | 2/1976 | Glasgow et al. | 422/144 |
| 4,269,211 | 5/1981 | Howard et al. | 137/118 |
| 4,434,810 | 3/1984 | Atkinson | 137/846 |
| 4,441,374 | 4/1984 | Suzuki | 422/81 |
| 4,458,066 | 7/1984 | Caruthers et al. | 536/29 |
| 4,524,805 | 6/1985 | Hoffman | 137/846 |
| 4,535,818 | 8/1985 | Duncan et al. | 137/846 |
| 4,570,677 | 2/1986 | Roxton et al. | 137/883 |
| 4,646,784 | 3/1987 | de Leeuwe | 137/266 |
| 4,649,124 | 3/1987 | Hall | 422/89 |
| 4,673,008 | 6/1987 | McDermott | 137/266 |
| 4,712,578 | 12/1987 | White | 137/271 |
| 4,722,830 | 2/1988 | Urie et al. | 422/103 |
| 4,732,672 | 3/1988 | Kiang et al. | 422/70 |
| 4,781,309 | 11/1988 | Vogel | 222/129.1 |
| 4,865,811 | 9/1989 | Newton et al. | 422/81 |
| 4,869,873 | 9/1989 | Klein et al. | 422/93 |
| 4,903,649 | 2/1990 | Staerzl | 123/73 A |
| 4,948,092 | 8/1990 | Kasper et al. | 137/846 |
| 4,951,709 | 8/1990 | Kirkham | 137/883 |
| 5,062,648 | 11/1991 | Gomringer | 137/846 |
| 5,081,871 | 1/1992 | Glaser | 422/84 |
| 5,089,232 | 2/1992 | May | 422/93 |
| 5,135,161 | 8/1992 | Goodman | 137/118 |

FOREIGN PATENT DOCUMENTS

| | | |
|---|---|---|
| 1688 | 8/1987 | European Pat. Off. |
| 12703 | 6/1988 | European Pat. Off. |
| 16466 | 3/1991 | European Pat. Off. |

*Primary Examiner*—Robert J. Warden
*Assistant Examiner*—T. A. Trembley
*Attorney, Agent, or Firm*—William H. May; P. R. Harder; Thomas Schneck

[57] ABSTRACT

A compact manifold for distribution of fluids (gas or liquid or combination thereof). The manifold has a block having fluid channels provided therethrough between two faces of the block. Against one face, a plate is fastened which swages ferrules between the plate and the block to tightly connect fluid conduits through the plate to the block. On the opposite face of the block, a manifold plenum is formed in a groove between a manifold plate and an o-ring. The o-ring is pressed against the manifold plate by a back plate and both plates are securely fastened onto the block such that the holes in the manifold plate are aligned with the fluid channels in the block. Checkvalves are positioned between the block and the manifold plate to prevent backflow. The above-mentioned components are positioned into their respective places and are secured upon the tightening of the fasteners. The manifold is configured with at least two plenums each having a group of distribution outlets. A checkvalve is provided at each outlet on the plenums. The plenums are connected to a single source in cascade, whereby the plenums are connected via a length of small diameter tubing which serves as a barrier against diffusion of fluid between the plenums. Thus, there are at least two checkvalves and a diffusion barrier tubing in the flow path between two reagent containers.

15 Claims, 5 Drawing Sheets

FLUID DISTRIBUTION MANIFOLD

BACKGROUND OF THE INVENTION

1. Field of the Invention

The present invention relates to fluid distribution manifold, and more particularly to manifolds suitable for use in automated chemical processing instruments.

2. Description of Related Art

In the past, fluid distribution manifolds typically consisted of a plenum made up of at least two major structural components that were usually assembled with a number of fasteners each requiring either a separate gasket or sealant. Fluid conduits were typically connected to the plenum, i.e. to one or both of the structural components, using some type of commercial fitting at each connection. While the commonality of such commercial fittings might result in relatively low component cost, the labor cost required to implement their use and assemble a manifold with a large number of conduits can be quite high. For manifolds to be used with small diameter conduits, it required additional effort to assemble the smaller components and to ensure that the appropriate torque is applied to each fitting. When the number of fittings increases, it becomes more difficult to ensure that all of the fittings are properly assembled.

Where a manifold is implemented in a chemical processing instrument for the purpose of pressurizing containers of different chemical reagents using a single fluid pressure source, there are concerns relating to cross-contamination of the reagents and thus the stability of the reagents. For example, in an automated DNA synthesis instrument, there are a number of reagents including amidites, acetonitrile, tetrazole, oxidizer reagents, etc. which are held in containers. These containers are pressurized to force a small quantity of each reagent to be dispensed from the containers in a specific sequence. In the past, to simplify the instrument configuration, a single gas source was used to pressurize the containers via a manifold and pressure conduits connected to the containers. It has been found that the vapors of the reagents diffuse through the pressure conduits from the containers back to the manifold and the vapors may further diffuse to other containers. The chemical stability of the reagents is extremely sensitive to moisture or contamination by other reagents. For example, acetonitrile is extremely hydrophilic. Moisture vapor from the oxidizer reagent can negatively affect the chemical stability of the acetonitrile. This is undesirable as it affects the reliability of the synthesis product, not to mention the waste associated with replacing the deteriorated reagents which are relatively expensive, as well as prematurely replacing good reagents left in the instrument after a period of time just in case they may have deteriorated.

SUMMARY OF THE INVENTION

The present invention relates to a manifold for distribution of fluids (gas or liquid or combination thereof) which has reduced the number of components and requires less effort for assembly of fluid conduits to the manifold. In accordance with the present invention, the function associated with assembling the manifold components is combined with the function associated with attaching the fluid conduits. That is, the conduits are positioned and are caused to be tightly attached to the manifold when its major components are being assembled. Fluid conduit connection fittings are not utilized and individual assembly of each conduit is no longer required.

In the described embodiment, the manifold comprises a manifold block having fluid channels provided therethrough between two faces of the block. Against one face, a plate is fastened which swages ferrules between the plate and the block to tightly connect fluid conduits through the plate to the block. On the opposite face of the block, a manifold plenum is formed in a groove between a manifold plate and an o-ring. The o-ring is pressed against the manifold plate by a back plate and both plates are securely fastened onto the manifold block such that the holes in the manifold plate are communicated with the plenum and are aligned with the fluid channels in the block. Checkvalves are positioned between the block and the manifold plate to prevent fluid backflow. The above-mentioned components are positioned into their respective places and are secured upon the tightening of the fasteners. When the manifold is used to distribute pressurized gas for dispensing chemical reagents, it reduces cross-contamination by vapor diffusion between the reagents in view of the checkvalves.

In another embodiment of the present invention, cross-contamination between reagents communicated to the manifold is further reduced. The manifold is configured with at least two plenums each having a group of distribution outlets. A checkvalve is provided at each outlet on the plenums. The plenums are connected to a single source in cascade, whereby the plenum downstream is connected to an outlet on the plenum upstream via a length of small diameter tubing which serves as a barrier against diffusion of fluid between the plenums. Thus, a reagent container connected to the plenum downstream has at least two checkvalves and a diffusion barrier tubing between it and a reagent container connected to the plenum upstream.

DESCRIPTION OF THE ILLUSTRATED EMBODIMENTS

The following description is of the best contemplated mode of carrying out the invention. This description is made for the purpose of illustrating the general principles of the invention and should not be taken in a limiting sense. The scope of the invention is best determined by reference to the appended claims.

Figure 1:
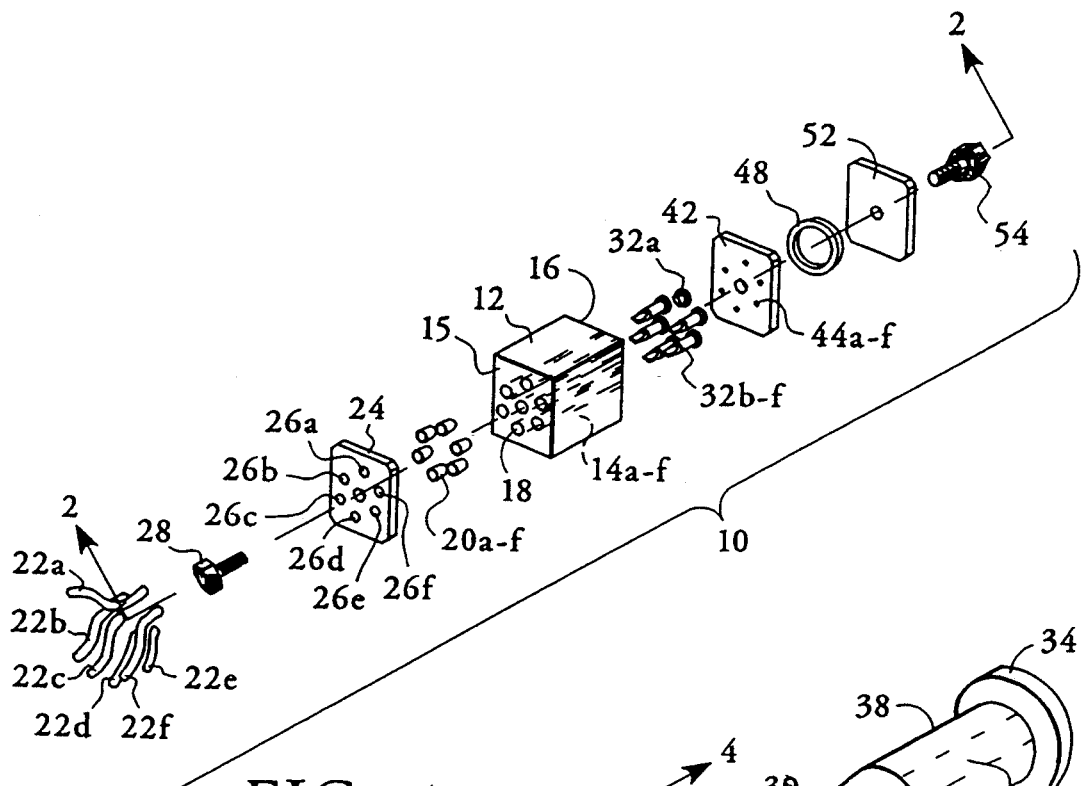
FIG. 1 is an exploded view of a manifold in accordance with one embodiment of the present invention.
Figure 2:
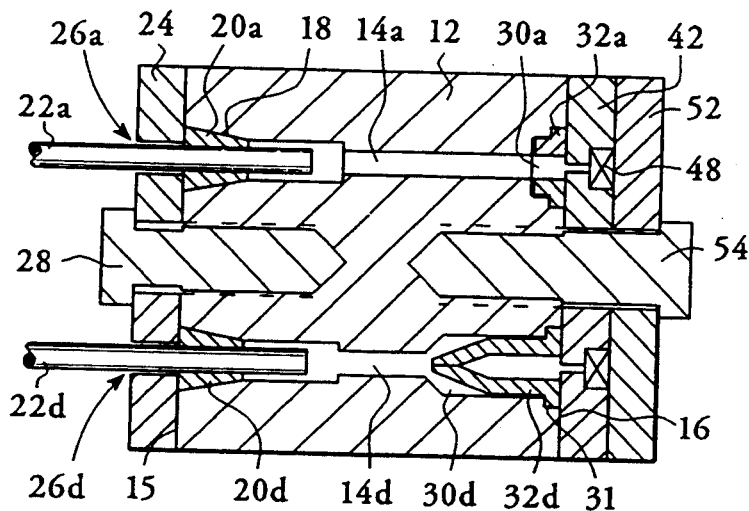
FIG. 2 is a sectional view taken along line 2—2 in FIG. 1.

FIG. 1 shows an exploded perspective view of the components of the fluid distribution manifold in accordance with one embodiment of the present invention. It is noted that the term "fluid" used herein includes liquid and gas phases, and also two-phase flows. FIG. 2 is a sectional view showing the assembled manifold 10. This embodiment will handle fluid distribution from one input to five outputs as will be explained in greater detail below. An aluminum manifold block 12 has six parallel fluid channels 14a–f drilled therethrough between two opposite faces of the block 12. One end of each channel 14a–f is countersunk at the front face 15 of the block 12. The countersinks 18a–f at the front face 15 are shaped to receive ferrules 20a–f for securing to fluid conduits 22a–f. Specifically, the fluid conduits 22a–f are threaded through a front plate 24 and the ferrules 20a–f. The front plate 24 has six clearance holes 26a–f which are sized to receive the fluid conduits 22a–f. The clearance holes 26a–f are in line with the fluid channels 14a–f in the manifold block 12. The front plate 24 is assembled against the front face 15 of the manifold block 12 by use of a screw or bolt 28. Upon tightening of the bolt 28, the ferrules 20a–f are simultaneously subjected to pressure of the front plate 24, and are compressed between the front plate 24 and the manifold block 12. This causes the ferrules 20a–f to be tightly swaged against the fluid conduits 22a–f. The choice of material of the ferrules 20a–f depends on the material of the conduits 22a–f. For plastic conduits, silicone or other plastic ferrules may be suitable. One of the six conduits (22a) is used for fluid input and the other five conduits (22b–f) are used for fluid output distributions.

Thus, it can be seen that by tightening a single bolt 28, the fluid conduits 22a–f can be securely attached to the manifold block 12. If the number of fluid conduits 22a–f becomes large, it may be necessary to use additional bolts in order to uniformly apply pressure on the front plate 24 for securely attaching the fluid conduits 22a–f to the manifold block. The fluid conduits 22a–f should be of a material that is non-reactive with the fluid passed therethrough or chemicals that are exposed in the distribution system.

Figure 3:
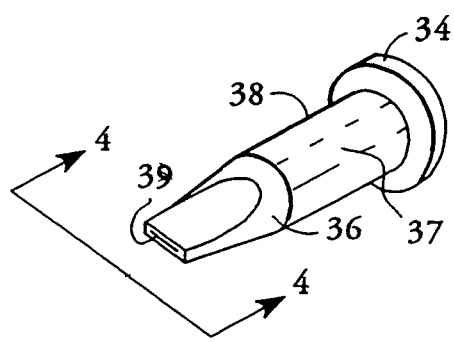
FIG. 3 is a perspective view of a checkvalve seal used in the manifold.
Figure 4A:
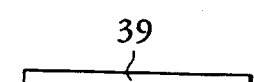
FIG. 4A is an end view of the checkvalve seal in FIG. 3 in its closed position.
Figure 4B:
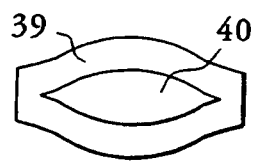
FIG. 4B shows the checkvalve seal in its open position.

In FIG. 2, counter bore 30d exemplifies the structure of the remaining counterbores 30b–c, e–f (not shown) by having a shoulder 31 provided on the back face 16 of the manifold block 12 shaped to received a coned shaped seal 32d. Cone shaped seal 32d exemplifies the structure of the remaining cone shaped seals 32b–c, e–f (not shown). Except for the seal 32a that is in line with the input fluid conduit 22a, the other five seals 32b–f, as shown in FIG. 1 also double to function as checkvalves to prevent backflow. The seals 32a–f are made of a suitable elastomeric material, which should be non-reactive with the fluid to be handled by the system or any potential backflow from the output fluid conduits 22b–f. The seals may be purchased from Vernay Laboratories, Inc., Yellow Springs, Ohio, U.S.A. (Model No. VA 3143). FIG. 3 more clearly illustrates the configuration of the checkvalve seals 32b–f. The seal has a flat flange portion 34 facing away from the manifold block 12. Referring also to FIG. 2, when assembled, the flange 34 seats on the shoulder 31 and should be slightly above the face 16 of the manifold block 12. A tapered portion 36 extends from a generally hollow cylindrical portion 38 having a fluid channel 37, thereby defining a unidirectional checkvalve 39. FIG. 4A shows the configuration of the valve 39 in its normally closed position under elastic tension. Upon the flow of fluid from the flange end 34 to the tapered end, 36 the flow will open the valve 39 against its elasticity, defining an opening 40 as shown in FIG. 4B. Any flow in the opposite direction will not open the valve opening 40. This reverse flow will press on the tapered surfaces to maintain the valve opening 40 in a tightly closed configuration. This is in addition to the fact that the valve 39 is normally closed under its elastic tension when there is no forward flow. The valve 39 also prevents back flow of vapor which may be at low pressure.

As to the seal 32a that is associated with the input fluid conduit 22a, it does not have a tapered valve portion in order to allow flow into the plenum 50 (see FIG. 5 and discussion below). The seal 32a only has a flange and cylindrical portion which are much like those of the seals 32b–f. This seal 32a is seated in a shallow counterbore 30a with a shoulder for seating the flange of the seal 32a.

A manifold plate 42 is designed to be positioned against the seals 32a–f. This manifold plate 42 has six holes 44a–f drilled therethrough which are smaller in diameter than the fluid channels 37 in the body 38 of the checkvalve. The holes 44a–f are located in line with the fluid channels 14a–f in the manifold block 12. Referring to FIG. 2 when the flat surface of the manifold plate 42 is pressed against the seals 32a–f, it compresses the flat flanges 34 to form a seal between each flange 34 and the flat surface of the manifold plate 42. More specifically, each flange seals 34 around a hole in the plate 42, the hole 44a–f being smaller in diameter than the fluid channel 37 in the body 38 of checkvalve. On the other side of the manifold plate 42, an annular groove 46 is milled at the same radius as the holes 44a–f, such that the holes 44a–f communicate to the groove 46. An annular gasket 48 is provided in the groove. Referring to FIG. 5, this gasket 48 has an x-shaped cross-section. A fluid plenum 50 is thus formed between the groove 46 and the annular gasket 48. A back plate 52 secures the gasket 48 in the groove 46 of the manifold plate 42. A single screw or bolt 54 is used to securely attach the manifold plate 42 and the back plate 52 against the manifold block 12. Upon tightening of the bolt 54, the elastic components, i.e. seals 32a–f and gasket 48, are compressed.

Upon assembly of the aforedescribed components, the fluid passage of the distribution manifold 10 is now complete. Fluid entering the manifold block 12 from the input conduit 22a flows through the fluid channel 14a in the manifold block 12, the seal 32a and through the hole 44a in the manifold plate 42 into the plenum 50 defined between the groove 46 and the gasket 48. From the plenum 50, the fluid distributes through the five holes 44b–f in the manifold plate 42, past the checkvalve seals 32b–f and into the fluid channels 14b–f in the manifold block 12. The fluid exits the manifold block 12 through the output conduits 22b–f. The number of outputs of the distribution block 10 may be varied by varying the number of fluid channels 14b–f in the manifold block 12, and appropriately modifying the cover plate 24 and manifold plate 42 to accommodate the different number of outputs. By using checkvalves, vapor diffusion cross-contamination is reduced in those manifold applications where a pressurized gas is applied through the manifold to pressurize containers of reagents.

Figure 6:
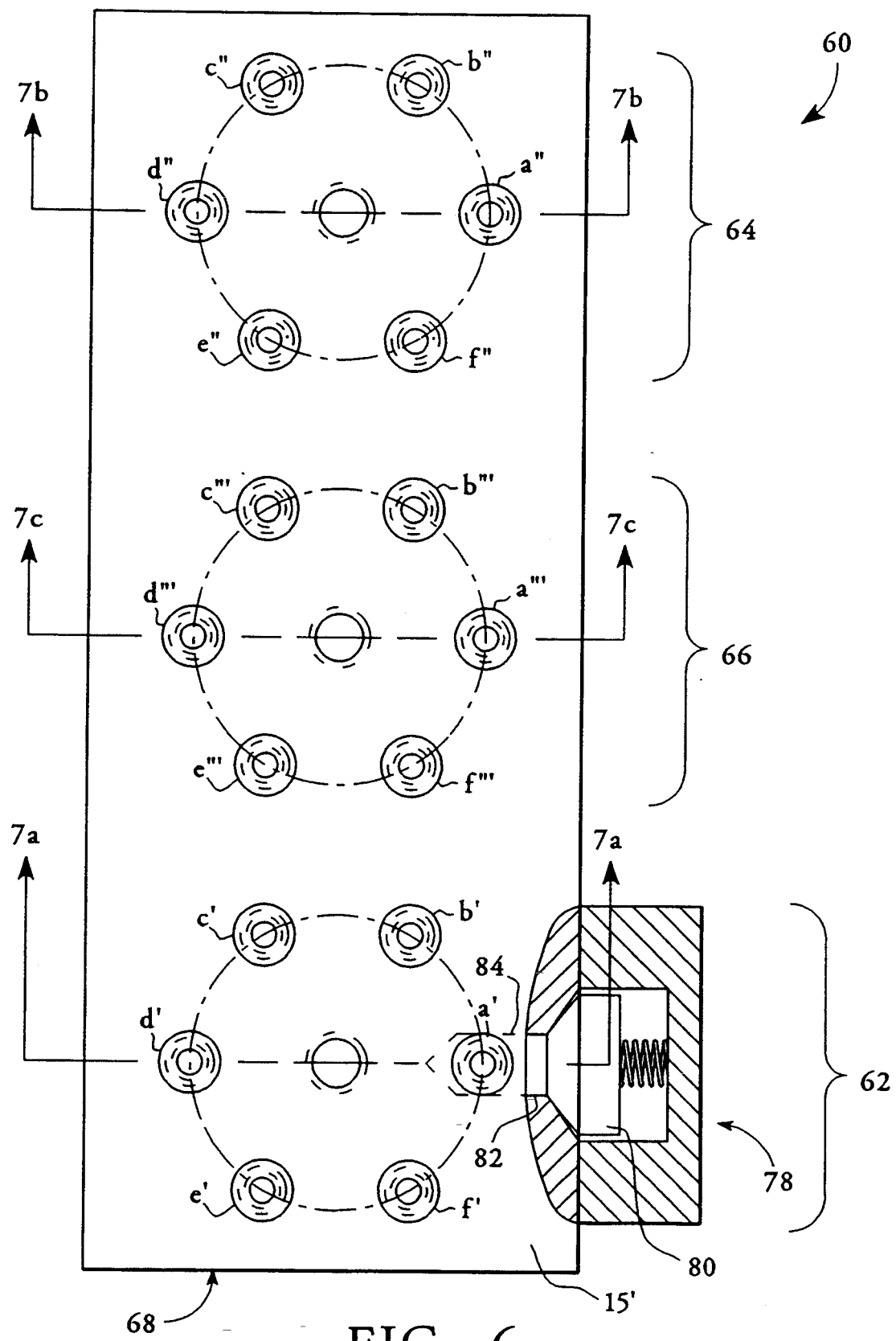
FIG. 6 is top view of the manifold block in an integrated manifold in accordance with one embodiment of the present invention.
Figure 7A:
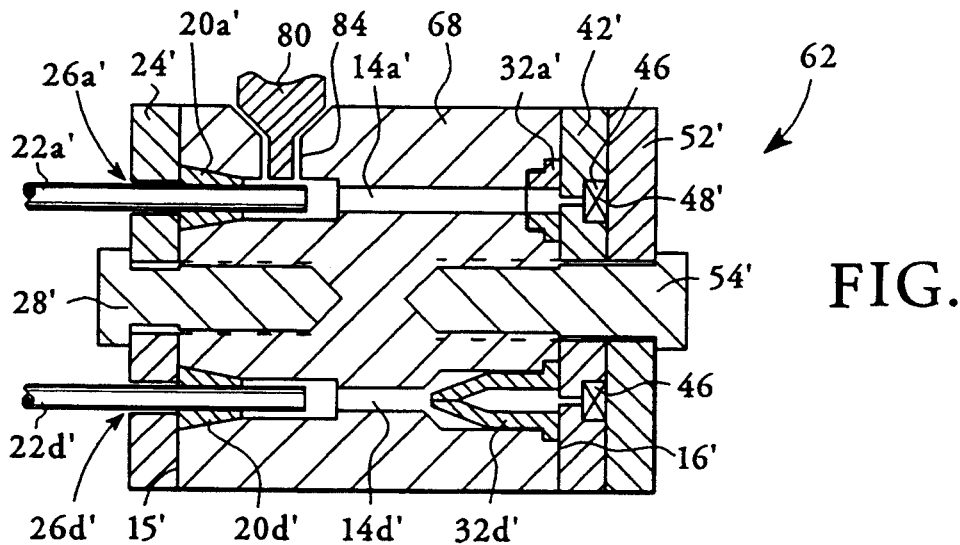
FIGS. 7A–C are cross-sectional views of the manifolds in the integrated manifold of FIG. 6.
Figure 7B:
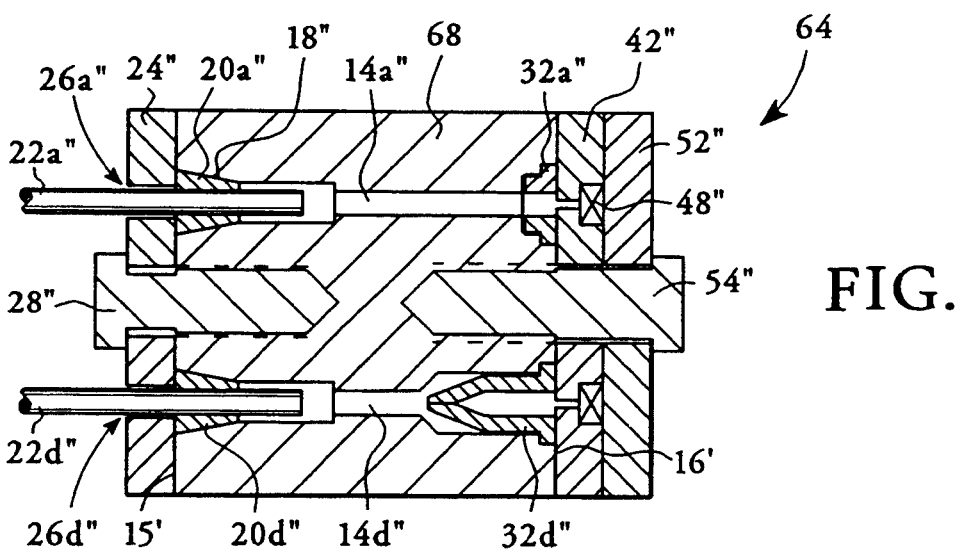
Figure 7C:
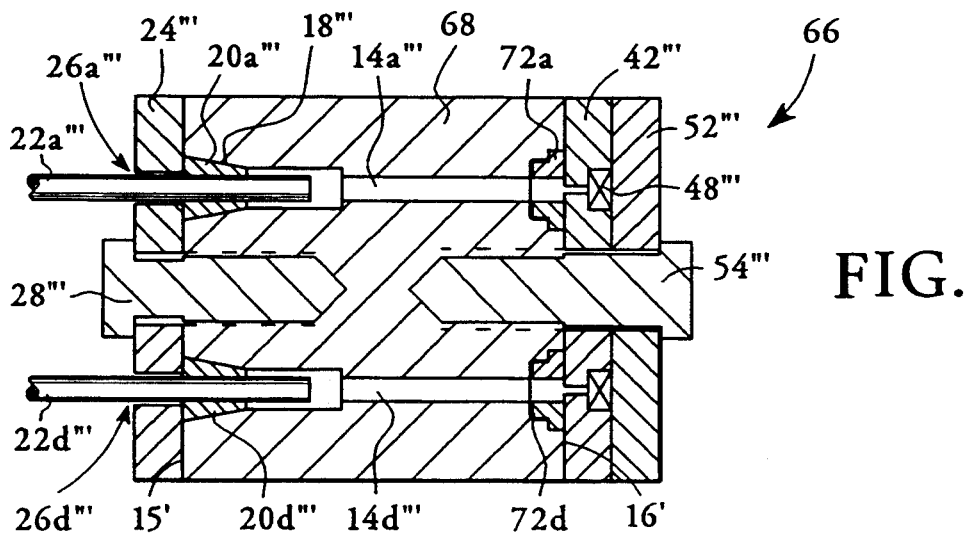

Referring to FIGS. 6–7 (reference numerals with "prime" identify similar structure as previous embodiment), it is shown an integrated manifold 60 having three separate manifolds 62, 64 and 66 in a single manifold block 68. Two of the manifolds 62 and 64 have similar internal structure as the previously described embodiment (compare FIGS. 7A and 7B to FIG. 2). The center manifold 66, however, has a different configuration in that there are no checkvalves therein. Rather, seals 72a and 72d, which exemplify seals 72b–c and 72e–f as well, are similar to the seal 32a in the previous embodiment. This center manifold 66 can be used with downstream flow components that do not create a backflow problem. For example, the output conduits from the center manifold 66 can be connected to receptacles having low vapor substances whereby it is not expected for vapors to diffuse back to the manifold 66. One of the output conduits from one manifold may used as the input conduit of one or both of the other two manifolds. That is to say, the manifolds 62, 64 and 66 may be cascaded. The manifolds have separate individual front plates (24', 24", 24'''), back plates (52', 52", 52'''), and manifold plates (42', 42", 42''') like those described in the previous embodiment (FIG. 2).

On the side of the manifold block 68 is provided a pressure relief valve 78 which is in fluid communication with the input conduit 22a of manifold 62. A poppet 80 having an o-ring 82 is received in a cylindrical cavity 84 in the manifold block 68. The poppet 80 is spring-biased towards the manifold block 68. The spring force is selected to correspond to the threshold pressure at which the relief valve 78 should be opened. Below the threshold pressure, the o-ring 82 of the poppet 80 prevents venting of pressure from the manifold 62. When the pressure in the conduit 22a exceeds the pressure threshold as defined by the spring bias, the pressure will force the poppet 80 away from the manifold block 68 thereby loosening the o-ring seal 82 to allow pressure to be relieved.

Figures 5, 8B:
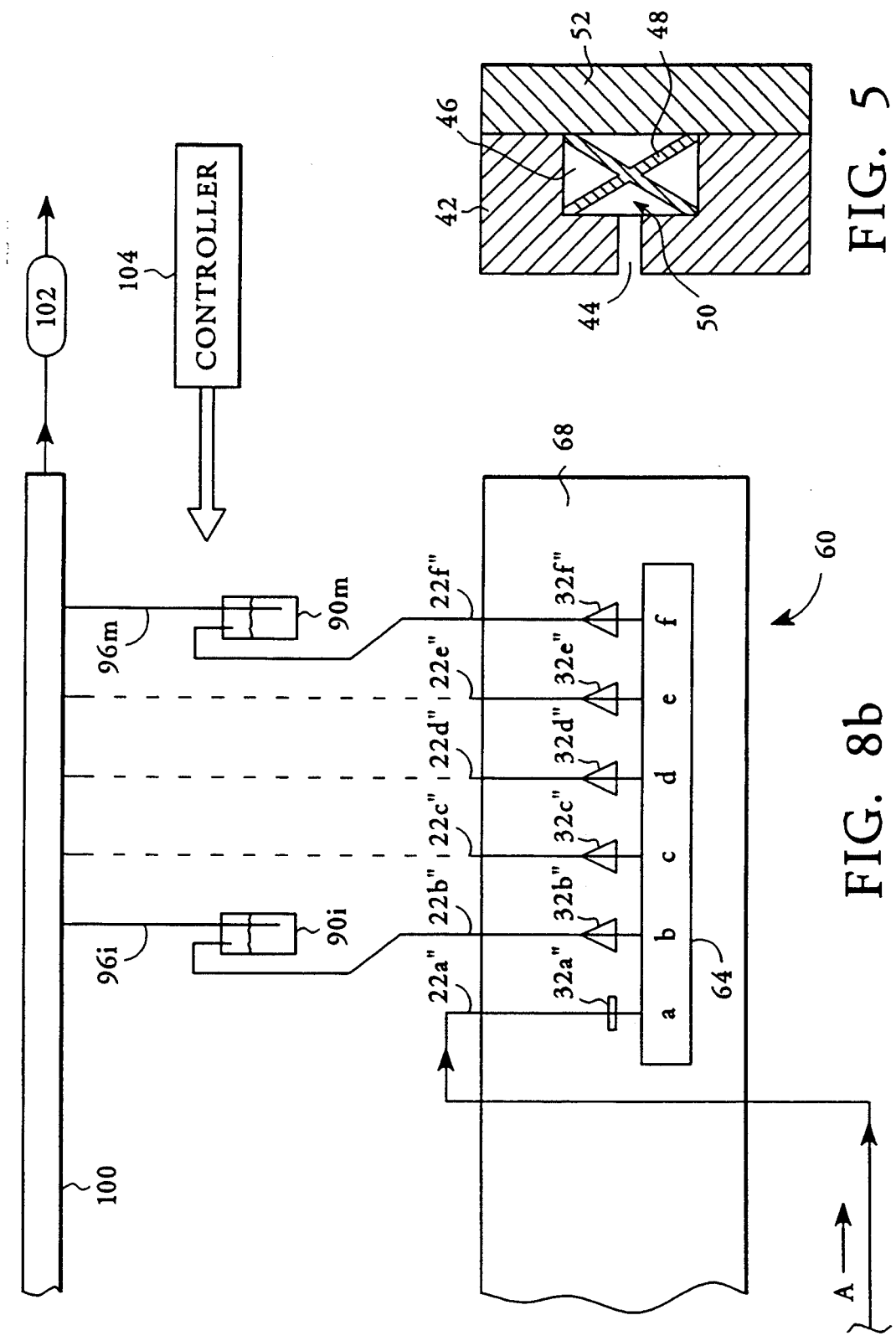
FIG. 5 is a section view of the gasket located between the manifold plate and the backplate.
FIGS. 8a–b is a schematic diagram illustrating how the manifolds may be cascaded in an automated DNA synthesizing instrument.
Figure 8A:
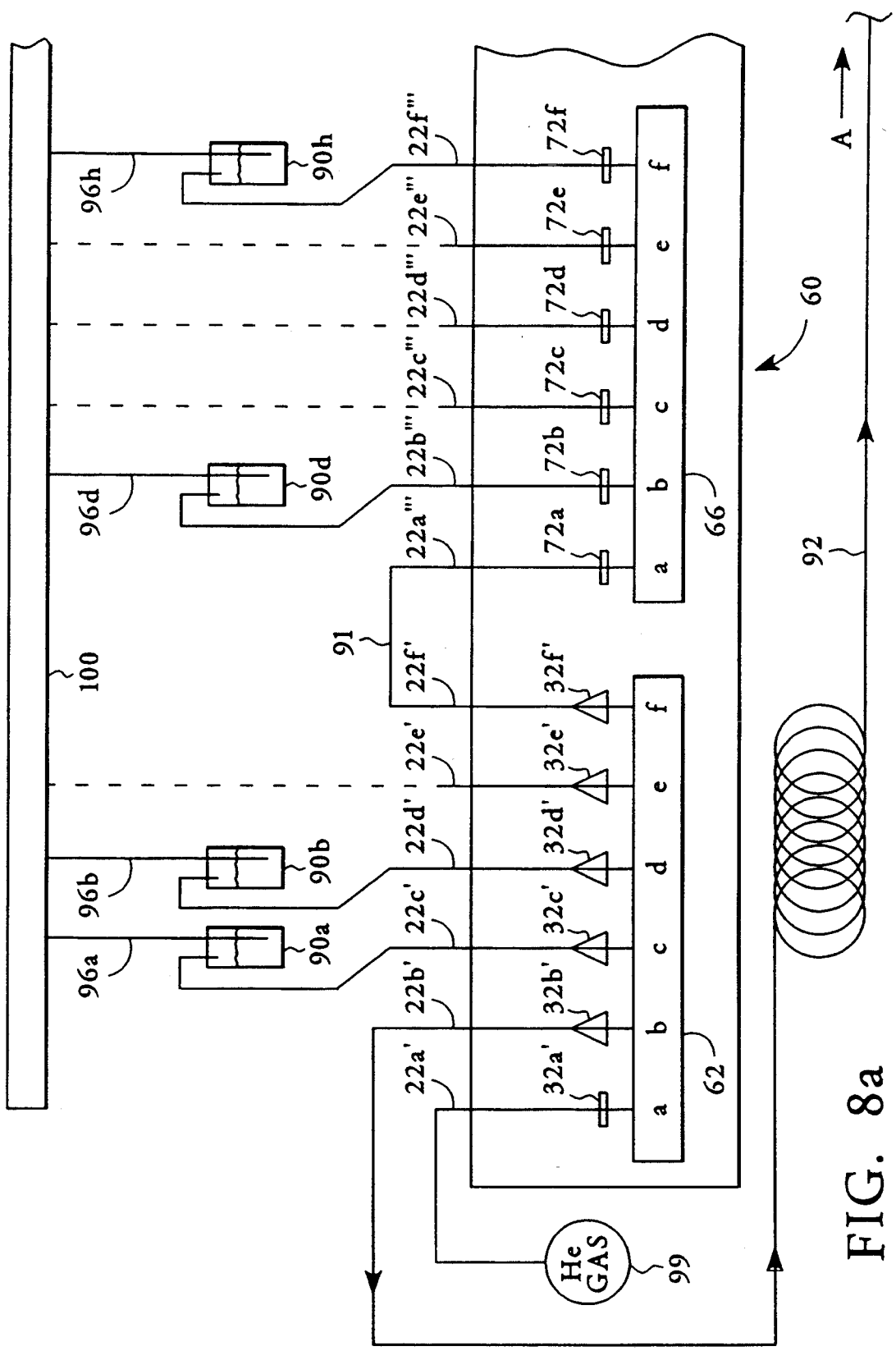

Referring to FIGS. 8a and 8b, a schematic flow diagram illustrates how the integrated manifolds described above may be implemented for gas pressurizing reagents in an automated DNA synthesizing instrument in accordance with one embodiment of the present invention. DNA synthesizing is well known, and has been reported by many researchers in the field. U.S. Pat. No. 4,458,066 to Caruthers et al discloses an automated DNA synthesizing instrument, and this patent is incorporated by reference herein. This patent discloses the chemical reagents and the methodology for synthesizing DNA. Therefore, the synthesis process will not be described in detail here, but will be referred to the extent necessary to describe the features of the present invention.

In FIGS. 8a and 8b, a simplified flow diagram is shown. The integrated manifold 60 is connected to various reagent containers 90a–m as shown. These containers contain tetrazole, acetonitrile, amidites, capping reagents, deblocking reagent, etc. required for nucleic acid synthesis.

The containers 90a–m are connected to the outputs of the manifolds 62, 64 and 66 in such a manner that will allow the reagents in the containers 90a–m to be gas pressurized and dispensed from the containers 90a–m. Specifically, the containers 90a–m are sealed with caps and the output conduits from the manifold 60 direct a pressurized inert gas (e.g. helium) to a space above the reagent level in each sealed container. The input 22a' of the manifold 62 is connected to a source 99 of pressurized helium gas.

The dispensing conduits (96a–m) from the containers 90a–m are connected to valves collectively and schematically shown by block 100 which controls the sequence of the reagent flow from the containers. Upon opening of a valve for a dispensing conduit, the reagent in the container will flow under the pressure above the reagent level. The reagents sequentially flow through a reaction column where DNA synthesize takes place. The synchronization of valve actuations as well as other control functions are controlled by a programmable controller 104.

Output 22f of manifold 62 is connected to the input 22a''' of the manifold 66 via a length of tubing 91 and the output 22b' of manifold 62 is connected to the input 22a'' of manifold 64 by a length of tubing 92. Preferably, the tubing 92 should be of a small diameter and sufficient length to "resist" diffusion of reagent vapor in the tubing 92. The exact diameter and length of tubing 92 will depend on the type of vapor of concern and can be determined without undue experimentation.

In the illustrated example, containers 90a and 90b of tetrazole and acetonitrile are connected to manifold 62 via checkvalve seals 32c and 32d, container 90m of oxidizer reagent is connected to the manifold 64 via checkvalve seal 32f', and containers 90d to h of amidites are connected to the manifold 66 via seals 72b–f. In addition to these, there are other reagents which are connected to the rest of the manifold output. The checkvalve seals 32 allow flow in the direction away from the respective manifold. It can be seen that since acetonitrile is very hydrophilic, it is placed at a manifold that is two checkvalves "away" from the more vaporizable oxidizer reagent. That is, between the oxidizer container 90m and the acetonitrile container 90b, there are two checkvalves 32f' on manifold 64 and 32d' on manifold 62 which prevent flow of oxidizer vapor from contaminating the acetonitrile. In addition, the tubing 92 resists diffusion of oxidizer vapor to the manifold 62. Therefore there is triple safeguard against contamination of the reagents coupled to the manifold 62; two checkvalves and a "diffusion resistive" tubing.

Acetonitrile, for example, is less threatened by amidite vapor. Therefore, it is not necessary to provide checkvalves at the output conduits 22b''–f'' on the manifold 66. Therefore depending on the sensitivity of the reagents, the reagents are selectively coupled to the appropriate manifolds to prevent cross-contamination.

While the invention has been described with respect to the illustrated embodiments in accordance therewith, it will be apparent to those skilled in the art that various modifications and improvements may be made without departing from the scope and spirit of the invention. Accordingly, it is to be understood that the invention is not to be limited by the specific illustrated embodiments, but only by the scope of the appended claims.

We claim:

1. A fluid manifold comprising:
   a single body having a first surface, a second surface and a plurality of channels, each channel including a first end proximate the first surface and including a second end proximate the second surface;
   an input tube and a plurality of output tubes attached to the single body in communication with the channels;
   first means, connecting to the second surface, for defining a plenum, the plenum being in constant flow communication with the second end of each said channel;

elastomeric checkvalves positioned in the single body between the plurality of output tubes and the plenum which allow flow through the valves from the plenum to the output tubes but restrict flow in a reversed direction.

2. A fluid manifold as in claim 1:

wherein the input and output tubes are each uniquely associated with one of the channels;

wherein the single body further includes second means for attaching the input and output tubes to the first surface, thereby allowing flow between the respective channels and tubes;

wherein the elastomeric checkvalves are each associated with one of the channels, the second surface having means defined thereon for receiving the elastomeric checkvalves to allow flow between the elastomeric checkvalves and channels.

3. A fluid manifold as in claim 2 wherein the second means includes:

ferrules each associated with one of the channels, the first surface having means defined thereon to receive the ferrules;

a first place having holes defined therein each associated with one of the channels, whereby the input and output tubes are each inserted into one of the holes through the first plate and into one of the ferrules;

means for attaching the first plate against the first surface to thereby simultaneously swage the ferrules to secure the input and output tubes.

4. A fluid manifold as in claim 2 wherein the first means includes:

a second plate having a groove defined thereon and holes defined therein each associated with one of the channels and communicating the groove to the channels;

a third plate sealed to the first plate covering the groove to thereby define the plenum in the groove.

5. An automated chemical processing system comprising:

a plurality of containers containing chemical reagents;

means defining a location for a chemical reaction in flow communication with the plurality of containers;

means for gas pressurizing the plurality of containers to dispense the chemical reagents to the reaction location, said means comprising:

a source of pressurized gas;

a first manifold including a single body having a first surface, a second surface and a plurality of channels, each said channel including a first end proximate the first surface and a second end proximate the second surface;

an input tube connected to the source and a plurality of output tubes attached to the single body in communication with the channels and the plurality of containers;

first means, connecting to the second surface, for defining a plenum, said plenum being in constant flow communication with the second end of each said channel;

elastomeric checkvalves positioned in the single body between the plurality of output tubes and the plenum which allow the pressurized gas to flow through the elastomeric checkvalves from the plenum to the plurality of output tubes but restrict flow in a reversed direction, said pressurized gas from the plenum pressurizing the chemical reagents in the containers;

means for controlling dispensing of the chemical reagents to the reaction location in a predetermined sequence to accomplish a desired chemical reaction.

6. A system as in claim 5:

wherein the input and output tubes are each uniquely associated with one of the channels;

wherein the single body further includes second means for attaching the input and output tubes to the first surface thereby allowing flow between the respective channels and tubes;

wherein the elastomeric checkvalves are each associated with one of the channels, the second surface having means defined thereon for receiving the elastomeric checkvalves to allow flow between the elastomeric checkvalves and channels.

7. A system as in claim 5 wherein the first means includes:

a second plate having a groove defined thereon and holes defined therein each associated with one of the channels and communicating the groove to the channels;

a third plate sealed to the first plate covering the groove to thereby define the plenum in the groove.

8. A system as in claim 5 further comprising:

a second manifold having an input tube and several output tubes, whereby the first and second manifolds are connected in cascade in a manner wherein the input tube of the second manifold is connected to one of the output tubes of the first manifold;

a diffusion barrier tube connecting the first and second manifolds of sufficient diameter and length to reduce chemical reagent vapor diffusion through said diffusion barrier tube.

9. A fluid manifold comprising:

a single body having a first surface, a second surface and a plurality of channels, each said channel including an outlet;

an input tube;

a plurality of output tubes;

first means, connecting to said second surface, for defining a plenum, said plenum being in constant flow communication with each said channel;

mounting means for simultaneously securing at least the plurality of output tubes to the channel outlets, wherein the mounting means has throughholes through which the plurality of output tubes extend to connect to the channel outlets;

means for securing the input tube to the single body.

10. A fluid manifold as in claim 9 wherein the mounting means includes:

ferrules each associated with one of the plurality of output tubes, said first surface having means defined thereon to receive the ferrules;

a first plate having holes defined therein, whereby the plurality of output tubes are each inserted into one of the holes through the first plate and into one of the ferrules;

means for attaching the first plate against the first surface to thereby simultaneously swage the ferrules to secure the plurality of output tubes to the single body.

11. A fluid manifold as in claim 10 wherein the single body further includes channels communicating between the first surface and the plenum.

12. A fluid manifold as in claim 11 further comprising elastomeric checkvalves positioned in the single body between the plurality of output tubes and the plenum which allow flow through the elastomeric checkvalves from the plenum to the output tubes but restrict flow in a reversed direction.

13. A fluid manifold as in claim 12 wherein the second surface has means defined thereon for receiving the elastomeric checkvalves whereby the plenum is in flow communication with the channels through the elastomeric checkvalves.

14. A fluid manifold as in claim 13 wherein the first means includes:

a second plate having a groove defined thereon and holes defined therein each associated with one of the channels for communicating the groove to the channels;

a third plate sealed to the second plate covering the groove to thereby define the plenum in the groove.

15. A fluid manifold as in claim 9 wherein the means for securing the input tube includes a ferrule received at the first surface, wherein a first plate has a hole which the input tube is fed through to be inserted into the ferrule, whereby as the first plate is attached against the first surface the input tube is secured to the single body simultaneously with the plurality of output tubes.

* * * * *